June 3, 1952     R. W. GARRETT     2,599,251
WHEELED HARROW
Filed June 19, 1948     3 Sheets-Sheet 1
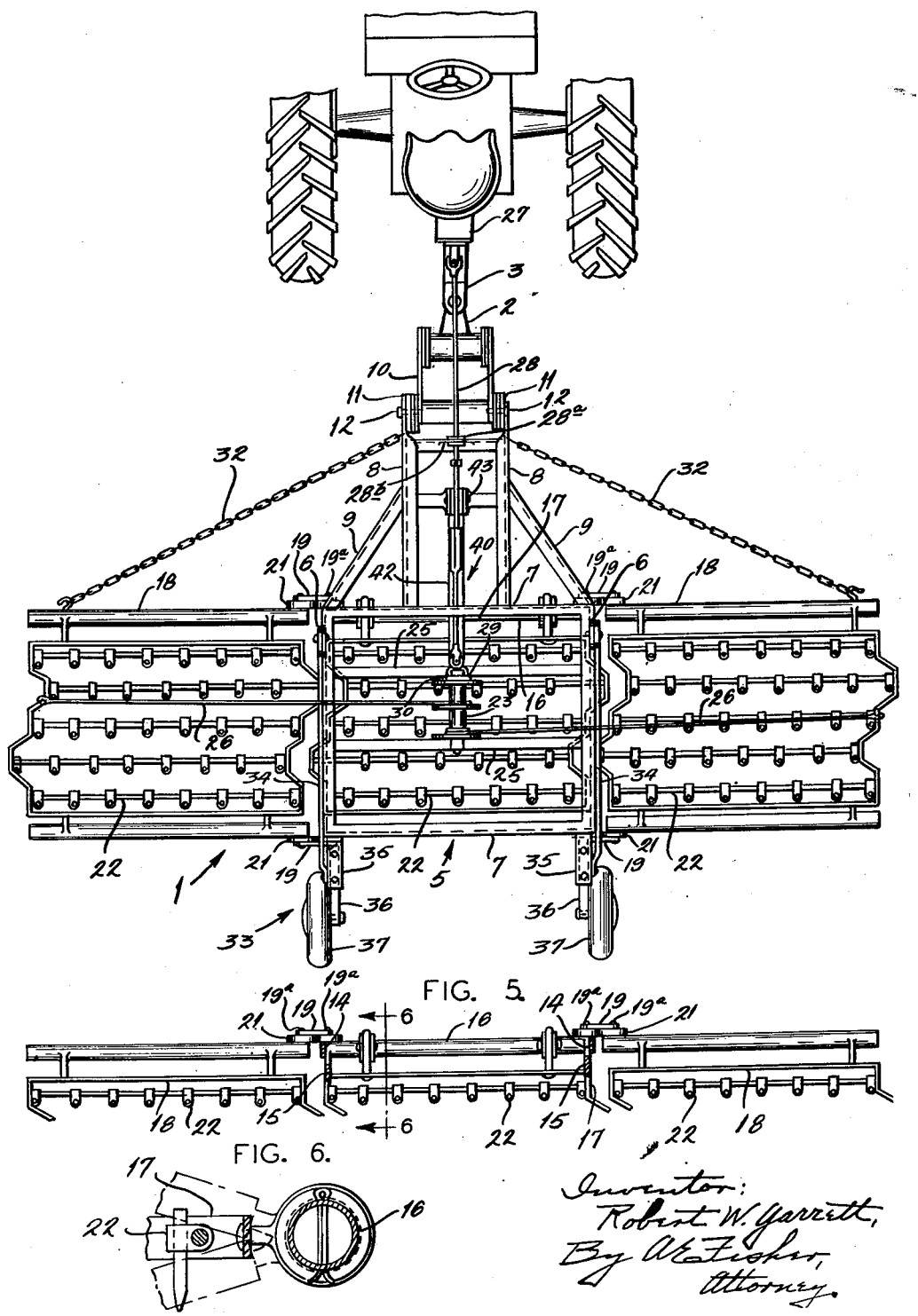

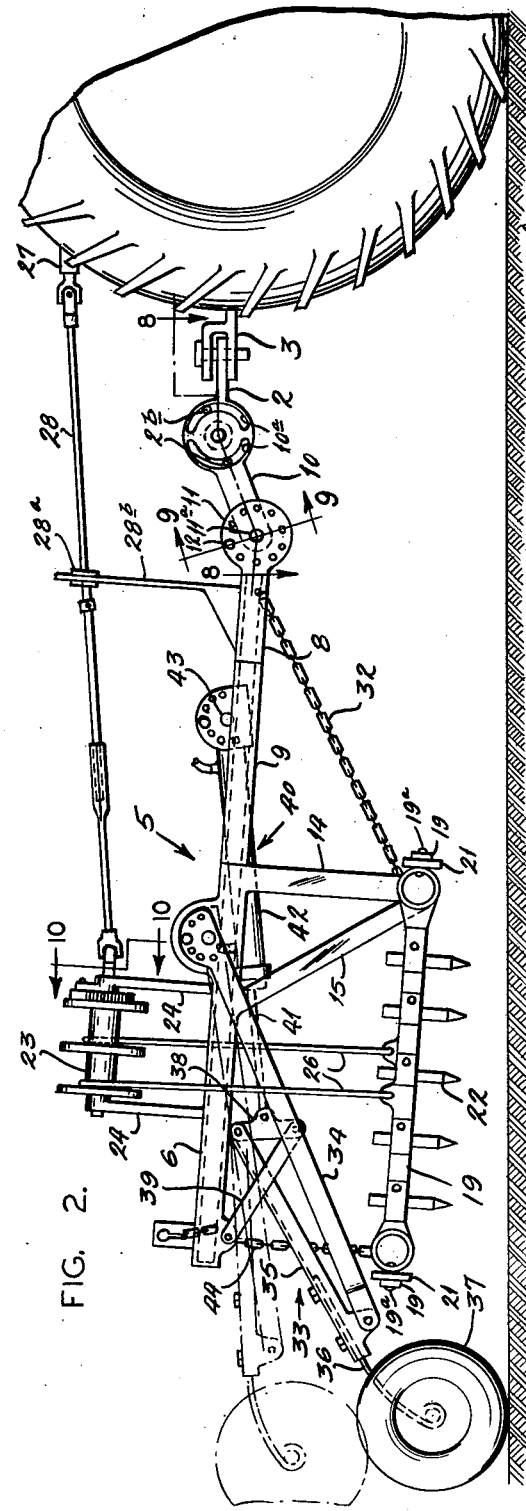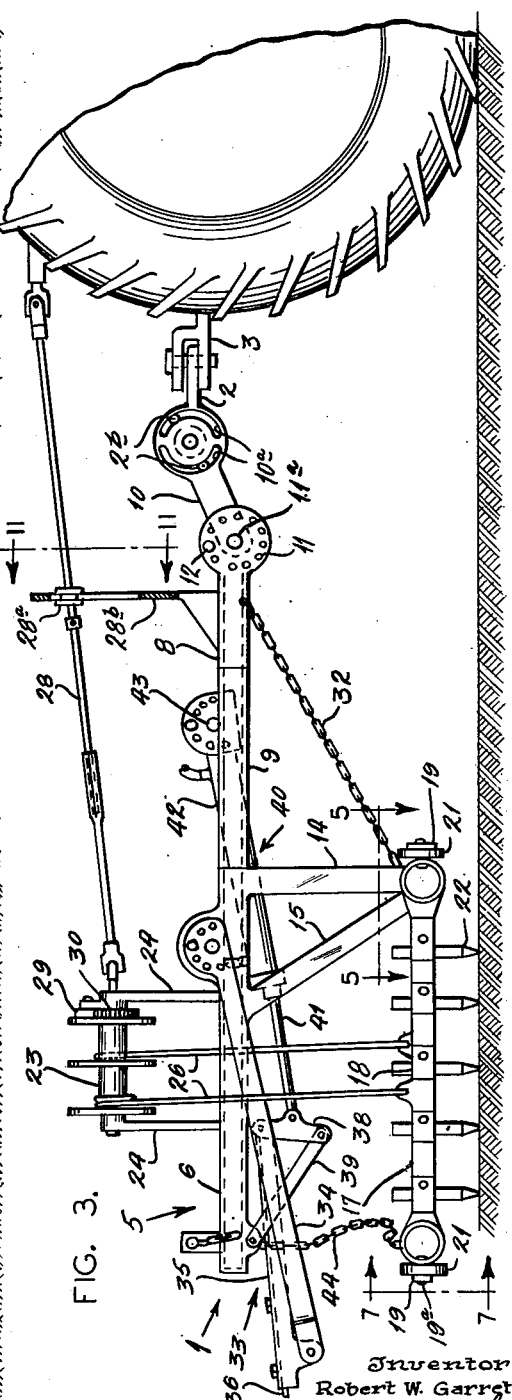

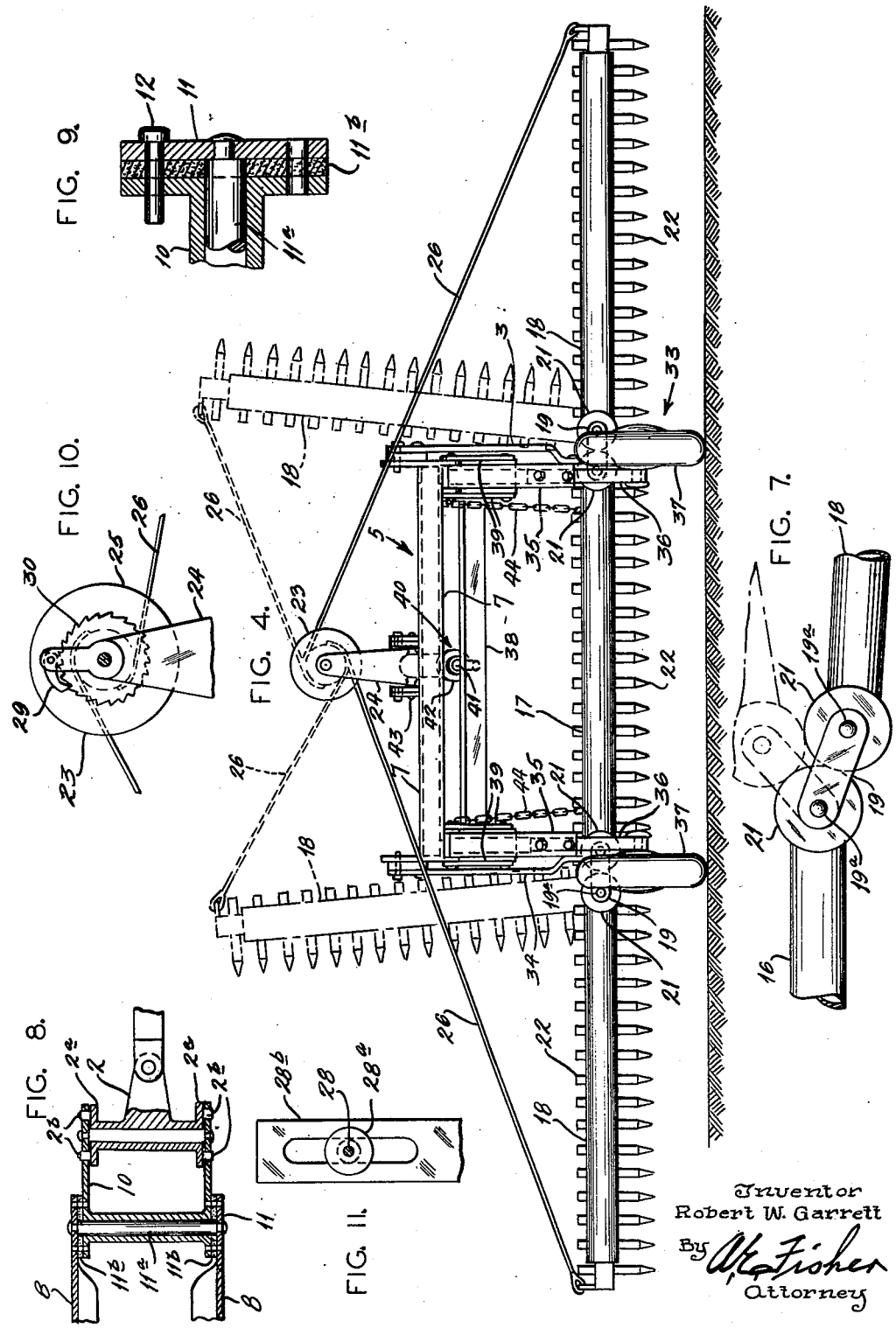

Patented June 3, 1952

2,599,251

UNITED STATES PATENT OFFICE 2,599,251

WHEELED HARROW

Robert W. Garrett, Coulterville, Ill.

Application June 19, 1948, Serial No. 34,073

1 Claim. (Cl. 55—19)

The invention relates generally to a harrow to be applied to and drawn by a tractor.

The main object of the invention is to provide a harrow structure, which includes a plurality of separate harrow units positioned side by side and extending transversely of the tractor and which may be readily moved from one field to another by the tractor.

Another object is to raise the harrow units off the ground by a retractible wheeled assembly.

Another object is to swing the outer units upwardly from a substantially horizontal position to a substantially vertical position so that the over-all width of the assembly is substantially the same as the width of the tractor to which it is applied.

Another object is to provide for relative vertical movement of the harrow units to accommodate irregularities in the ground surface.

Other objects will be apparent to those skilled in the art from the following description and accompanying drawings, in which:

Figure 1 is a top view of the rear portion of a tractor and a harrow structure applied thereto and constructed according to the invention.

Figure 2 is a side view of the structure shown in Figure 1 and drawn to an enlarged scale and shows the wheeled assembly lowered and the harrow units raised off the ground in solid lines, and shows the wheeled assembly raised in dot-dash lines.

Figure 3 is a view similar to Figure 2 showing the wheeled assembly retracted and showing the harrow units in functioning position on the ground.

Figure 4 is a rear view of the harrow assembly showing the wheels lowered and the harrow units raised above the ground and showing the outer harrow units in extended horizontal position in solid lines and in retracted substantially vertical position in dot-dash lines.

Figure 5 is a detail horizontal section taken approximately on the line 5—5 of Figure 3 and drawn to a smaller scale.

Figure 6 is a detail longitudinal vertical section taken approximately on the line 6—6 of Figure 5 and drawn to an enlarged scale.

Figure 7 is a detail rear view of the pivot mounting between the central and the outer harrow units and taken in the direction of the arrows 7 in Figure 3 and drawn to an enlarged scale.

Figures 8 and 9 are detail sections through a frame link and its pivots and taken approximately at right angles to one another on the lines 8—8 and 9—9, respectively, of Figure 2 and drawn to enlarged scale.

Figure 10 is a detail vertical transverse section taken approximately on the line 10—10 of Figure 2 and drawn to an enlarged scale and shows a cable winding reel for swinging the outer harrow units from one position to the other.

Figure 11 is a detail vertical transverse section taken approximately on line 11—11 of Figure 3 and drawn to an enlarged scale and shows a drive shaft for operating the reel from the tractor and a supporting bracket for the shaft.

The harrow structure 1 is secured by a draw bar 2 to a tractor coupler 3. The harrow structure includes a frame having an upper rectangular frame section 5 formed of a pair of longitudinal channel elements 6 and a pair of transverse channel elements 7. Channel members 8 are secured to the forward transverse element 7 and extend parallel to one another and forwardly of section 5. Braces 9 are rigid with and inclined to forward element 7 and members 8.

Perforated discs 11 are formed at the forward ends of members 8 and a transverse pin 11a is secured at its ends to the discs, as shown in Figure 8. A link 10 pivots in a vertical plane on pin 11a and on draw bar 2. Link 10 preferably is locked to discs 11 by a pin 12 so that frame section 5 is positioned horizontally when the harrow structure is in functioning position, as shown in Figure 3. A piece of felt 11b may be inserted between opposing faces of discs 11 and link 10. Link 10 normally is free to move relative to draw bar 2. The rear end of draw bar 2 preferably is spool-shaped and the flanges 2a on the spool mount rollers 2b which extend through semi-circular slots 10a in the link.

A leg 14 depends from each forward corner of frame section 5 and an inclined brace 15 is rigid with each element 6 and the lower end of the associated leg 14. An elongated pivot 16 extends between the lower ends of legs 14. A central harrow frame section 17 swings about its forward end on pivot 16. An outer harrow frame section 18 swings on each side of central section 17 between an extended substantially horizontal position, shown in solid lines in Figure 7 and a retracted substantially vertical position shown in dot-dash lines in the same figure. Outer sections 18 also may move vertically relative to central section 17 to accommodate ground irregularities. Each outer section 18 is connected to central section 17 by a pair of links 19 (Fig. 7) each attached at one end to the central section and at the other end to the associated outer section by spaced pivots 19a. Rollers 21 are rotatable on pivots 19a and engage one another to facilitate relative movement of the sections. A tined harrow unit 22 of any desired construction is mounted on each frame section 17, 18.

A divided reel 23 rotates on brackets 24 secured to and extending upwardly from a pair of transverse struts 25 rigid with elements 6. The reel winds a pair of cables 26 each having one end secured to an outer end of the harrow unit 22 on each outer section 18. The reel is rotated by a power take-off 27 on the tractor through a drive shaft 28 which extends through a spool 28a slidable in a slotted guide bracket 28b rigid with the frame. (See Figs. 3 and 11.) As cables 26 are wound on the reel, outer sections 18 swing upwardly from the horizontal solid line positions shown in Figure 4 to the vertical dot-dash line positions shown in the same figure.

A pawl 29 pivoted to bracket 24 and a ratchet wheel 30 rigid with reel 23 normally holds the reel against rotation in a direction to prevent unwinding of cables 26. The pawl may be moved manually out of engagement with the ratchet wheel to unwind the cables and swing sections 18 to horizontal position.

A chain 32 extends diagonally downwardly and rearwardly from the forward end of each member 8 to the outer forward end of each outer section 18 to relieve strain on the pivot assemblies as the harrow is drawn over the ground.

A retractable wheeled assembly 33 is provided for moving the harrow structure from one field to another. The wheeled assembly includes a pair of members 34 pivoted at their upper ends to elements 6 and at their lower ends pivotally mounting struts 35 having springs 36 secured thereto and mounting wheels 37. A transverse member 38 is pivoted to the upper ends of struts 35 and to a pair of links 39 connected to the rear end of elements 6. A horizontal hydraulic unit 40 includes an operating piston rod 41 connected to transverse member 38 and a cylinder 42, rotatable about a pivot 43, extending transversely to members 8. Hydraulic unit 40 is operated by the tractor and moves wheeled assembly 33 between a lowered extended position, in which wheels 37 rest on the ground and support the frame, as shown in solid lines in Figures 2 and 4, and an upper retracted position, in which the wheels are raised above the ground and are supported by the frame, as shown in Figure 3. When wheels 37 are lowered to the ground, the rear end of frame 5 is elevated and the harrow units are raised off the ground. Chains 44 are secured to elements 6 and to central section 17 and limit downward swinging movement of sections 17 and 18.

The harrow structure described above may be readily moved from one field to another by the tractor with wheeled assembly 33 in lowered position and with outer frame sections 18 folded to vertical retracted position. Also the harrow structure may be stored in a relatively small place without first disassembling the structure.

The outer harrow units may move vertically relative to the central harrow units to accommodate irregularities in the ground surface.

The details of the construction may be varied substantially without departing from the spirit of the invention and the exclusive use of those modifications coming within the scope of the claim is contemplated.

What is claimed is:

A retractable wheel assembly for mounting transversely at the rear end of a flat harrow frame for raising that end from the ground in moving the harrow from place to place, the front end of the harrow frame being provided with means for attachment to a tractor, and whereby the frontal end may also be raised from the ground in transporting the harrow, the harrow frame also having mounted thereon an elevated frame section with which the wheel assembly is pivotally connected, said wheel assembly comprising a pair of elongated members pivoted at their upper ends in laterally spaced relation to the upper portion of the elevated harrow frame section, the free ends of these said members being extended rearwardly and angularly downward, a pair of elongated relatively shortened struts pivoted at their lower ends to the lower ends of the said elongated members as extended from the elevated harrow frame section, springs anchored at their upper ends to the lower ends of said struts and extended outwardly therefrom, wheels operatively mounted at the lower ends of said springs, a transverse member pivoted at its ends to the upper ends of the said struts, a pair of elongated links pivoted at their upper ends to the rear portions of the elevated harrow frame section and at their inwardly inclined lower ends to the lower ends of short and vertically extended links pivotally connected at their upper ends to the upper ends of said struts, and chains connecting the rear portion of the elevated harrow frame section with the rear portion of the harrow frame, whereby through force and power as applied to the said transverse member, the wheels of the assembly may be either raised for lowering the harrow to the ground for use, or may be lowered into contact with the ground for elevating the harrow from the ground for transportation purposes.

ROBERT W. GARRETT.

REFERENCES CITED

The following references are of record in the file of this patent:

UNITED STATES PATENTS

| Number | Name | Date |
| --- | --- | --- |
| 971,591 | Booth | Oct. 4, 1910 |
| 1,154,763 | Gunderson | Sept. 28, 1915 |
| 1,767,619 | Rue | June 24, 1930 |
| 2,286,619 | Hokanson | June 16, 1942 |
| 2,458,091 | Moore | Jan. 4, 1949 |
| 2,469,622 | Acton | May 10, 1949 |